United States Patent

Bartos et al.

Patent Number: 5,256,923
Date of Patent: Oct. 26, 1993

[54] SWITCHED RELUCTANCE MOTOR WITH SENSORLESS POSITION DETECTION

[75] Inventors: Ronald P. Bartos, Menomonee Falls; Timothy H. Houle, Wauwatosa, both of Wis.; J. Herbert Johnson, Tipp City, Ohio

[73] Assignee: A. O. Smith Corporation, Wilmington, Del.

[21] Appl. No.: 880,934

[22] Filed: May 11, 1992

[51] Int. Cl.$^5$ .............................................. H02K 17/00
[52] U.S. Cl. ................................... 310/166; 310/68 B; 310/106; 310/111; 310/187; 318/701; 324/207.25
[58] Field of Search ....................... 310/168, 68 B, 111, 310/185, 186, 187, 188, 166, 105, 106, 259, 261; 318/254, 701; 324/207.13, 207.22, 207.25

[56] References Cited

U.S. PATENT DOCUMENTS

| | | |
|---|---|---|
| 3,688,306 | 8/1972 | Oishi ................................ 324/207.25 |
| 4,506,182 | 3/1985 | Rohdin ................................ 310/193 |
| 4,578,605 | 3/1986 | Reinhardt et al. . |
| 4,585,984 | 4/1986 | Bessho . |
| 4,599,531 | 7/1986 | Kubo ................................ 310/111 |
| 4,612,486 | 9/1986 | Ban ................................ 318/254 |
| 4,639,648 | 1/1987 | Sakamoto . |
| 4,733,116 | 3/1988 | Schulz ................................ 310/68 B |
| 4,855,630 | 8/1989 | Cole ................................ 310/156 |
| 4,900,963 | 2/1990 | Amano et al. . |
| 4,933,584 | 6/1990 | Harms et al. . |
| 4,985,669 | 1/1991 | Smith . |
| 5,003,259 | 3/1991 | Palazzetti et al. . |
| 5,015,927 | 5/1991 | Reichard . |
| 5,023,502 | 6/1991 | Johnson . |
| 5,041,769 | 8/1991 | Iwai . |
| 5,084,663 | 1/1992 | Olsson . |
| 5,130,646 | 7/1992 | Kumagai ........................ 324/207.22 |

FOREIGN PATENT DOCUMENTS 0610020  6/1978  U.S.S.R. ........................ 324/207.13

OTHER PUBLICATIONS

"Stepping Motors and Their Microprocessor Controls", Takashi Kenjo, Outline of Modern Stepping Motors, Clarendon Press, Oxford, 1985, pp. 25-33.
"Variable Speed Drives Using Multi-tooth Per Pole Switched Reluctance Motors", J. W. Finch et al, Switched Reluctance Motor Drives: A Reference Book of Collected Papers, Oct. 1988, pp. 220-228.
"Effect of Rotor Profiles on the Torque of a Switched-Reluctance Motor", M. Moallem et al, IEEE Transactions of Industry Applications, vol. 28, No. 2, Mar.-/Apr. 1992, pp. 364-369.

*Primary Examiner*—R. Skudy
*Attorney, Agent, or Firm*—Michael E. Taken; James Earl Lowe, Jr.

[57] ABSTRACT

A switched reluctance motor (10) provides position and speed detection without a shaft position sensor. At least one of the stator pole faces (54) and/or at least one of the rotor pole faces (60) has an irregularity such as a notch (52 and/or 58) providing a perturbation or blip (70, 82) in the inductance profile (72, 76, 84) of the motor (10) during rotation of the rotor (14) indicative of the position of the rotor (14) relative to the stator (12). The frequency of the perturbations indicates motor speed.

13 Claims, 2 Drawing Sheets

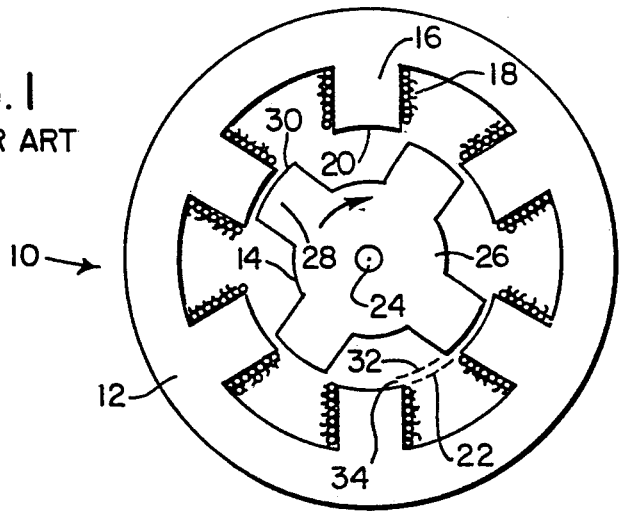
FIG. 1
PRIOR ART
FIG. 2
PRIOR ART
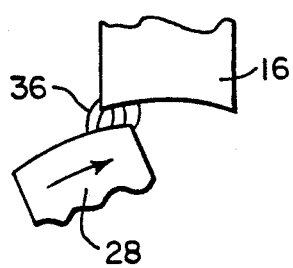
FIG. 4
PRIOR ART
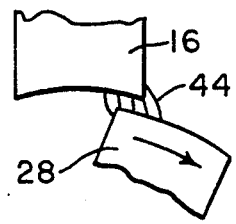
FIG. 3
PRIOR ART
FIG. 5
PRIOR ART
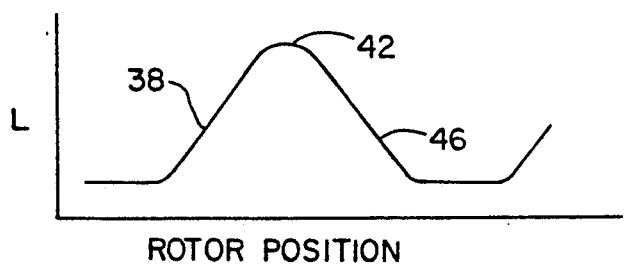
ROTOR POSITION
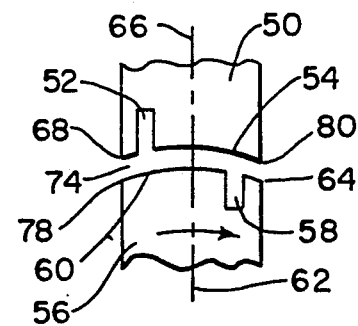
FIG. 6
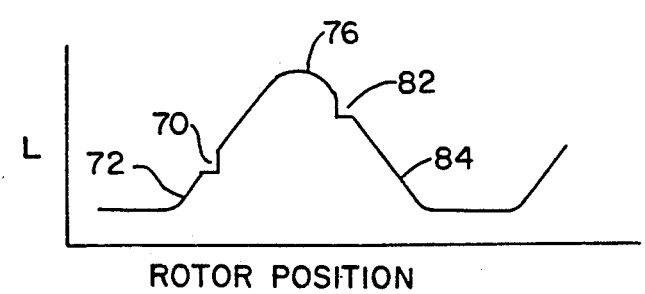
ROTOR POSITION
FIG. 7
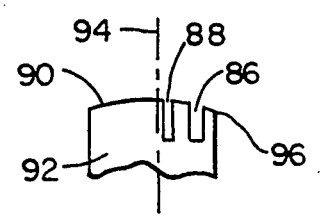
FIG. 8

SWITCHED RELUCTANCE MOTOR WITH SENSORLESS POSITION DETECTION

BACKGROUND AND SUMMARY

The invention relates to switched reluctance electric motors, and more particularly to position and speed detection without a shaft position sensor.

A switched reluctance motor includes a stator having a plurality of circumferentially spaced stator poles having windings therearound, and a rotor rotational about the motor shaft axis and having a central annular hub with a plurality of circumferentially spaced rotor poles extending radially outwardly from the hub. Each stator pole has an inner pole face subtending an arc along a circumference. Each rotor pole has an outer pole face subtending an arc along a second circumference concentric with and spaced slightly radially inwardly of the first circumference by a small clearance gap.

The stator windings are energized in a cyclic sequence to create a rotating magnetic field producing torque on the rotor which rotates to follow the rotating magnetic field. Generally, when the rotor reaches a maximum alignment position relative to the presently energized stator phase winding, the next phase should then be energized, to maximize torque production. The change from one motor state energizing one phase winding to the next motor state energizing the next phase winding is called commutation. It is desirable to know the position of the rotor, in order to select the proper commutation timing and phase energization, and hence provide the optimum magnetic field pattern for producing optimum torque on the rotor.

It is known in the prior art to sense rotor position with a shaft position sensor separate from the motor control, such as a Hall effect device, to provide properly timed switching commutation signals to the motor control. A drawback of shaft position sensors is that they add cost to the motor control, and require additional wiring. The additional wiring requirement is particularly objectionable when the motor is used to drive an air conditioning or refrigerator compressor which is hermetically sealed in a container, because the additional wires must be brought out of the hermetically sealed container, which further adds to the cost.

Various sensorless motor control commutation systems are known in the prior art. These systems monitor a changing motor parameter such as voltage, e.g. back EMF, current, e.g. regeneration current, or reluctance, e.g. by pulsing a phase winding with a test current. A drawback of these systems is that they require complex electronic circuitry for monitoring and discriminating the sensed waveforms. A further drawback is that the resultant waveform signal is not constant, but varies with motor speed and torque.

The present invention provides pole structure creating a change in motor inductance at a given rotor position. One or more irregularities, e.g. notches, are provided in one or more stator pole faces and/or one or more rotor pole faces, to create a unique pattern in the otherwise standard inductance profile of the motor, to allow rotor position detection. The irregularity causes a perturbation or blip in the inductance profile of the motor during rotation of the rotor, indicative of the position of the rotor relative to the stator. The frequency of perturbations indicates motor speed.

BRIEF DESCRIPTION OF THE DRAWINGS

FIG. 1 is a schematic sectional view of a switched reluctance motor known in the prior art.

FIG. 2 is a view of a portion of the structure of FIG. 1 showing approaching pole alignment.

FIG. 3 is like FIG. 2 and shows pole alignment.

FIG. 4 is like FIGS. 2 and 3 and shows further rotation of the rotor leaving pole alignment.

FIG. 5 is a graph of rotor position versus inductance and shows the standard inductance profile for the motor of FIG. 1.

FIG. 6 is like FIG. 3 but shows rotor and stator pole structure in accordance with the invention.

FIG. 7 is like FIG. 5 but shows the perturbation in the inductance profile in accordance with the invention.

FIG. 8 shows alternate notch structure.

DETAILED DESCRIPTION

Prior Art

Figure 9:
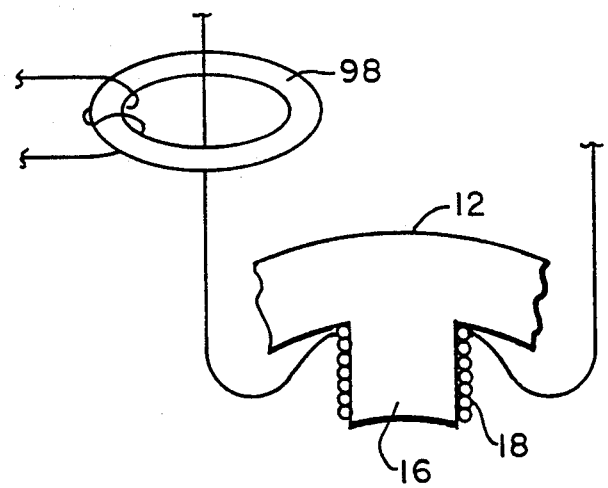
FIG. 9 shows circuitry for sensing phase current indicative of inductance.

FIG. 1 shows a switched reluctance electric motor 10 including stator 12 and rotor 14. The stator and rotor preferably each comprise a plurality of laminations, for example as shown in U.S. Pat. No. 5,023,502, incorporated herein by reference, and FIG. 1 shows a single lamination of each. The stator has a plurality of circumferentially spaced stator poles such as 16 having windings such as 18 therearound. Each stator pole has an inner pole face such as 20 subtending an arc along a circumference 22. The rotor is rotational about a motor shaft axis 24 and has a central annular hub 26 with a plurality of circumferentially spaced rotor poles such as 28 extending radially outwardly from the hub. Each rotor pole has an outer pole face such as 30 subtending an arc along a circumference 32 concentric with and spaced slightly radially inwardly of circumference 22 by a small clearance gap 34.

FIG. 2 shows rotor pole 28 approaching alignment with stator pole 16. The increasing magnetic flux coupling 36 provides increasing inductance along positive slope 38, FIG. 5, of the inductance profile of the motor. FIG. 3 shows rotor and stator pole alignment wherein stator pole face 20 and rotor pole face 30 are in a radial alignment position facing each other across gap 34 with maximum magnetic flux coupling 40 and maximum inductance 42, FIG. 5, therebetween. FIG. 4 shows further rotation of rotor 28 to a position leaving alignment with stator pole 16, with decreasing magnetic flux coupling 44 and decreasing inductance as shown at falling slope 46 in FIG. 5.

Present Invention

FIG. 6 shows modified stator and rotor pole structure in accordance with the invention. Stator pole 50 has a shape irregularity such as a notch 52 in pole face 54 and extending generally radially therefrom. Rotor pole 56 has an irregularity such as a notch 58 in pole face 60 and extending general 1 radially therefrom. In another embodiment (not shown) notch 52 is provided but notch 5 is omitted. In another embodiment (not shown), notch 58 is provided, but notch 52 is omitted. In other embodiments, notches may be provided in one or more of the rotor pole faces and/or one or more of the stator pole faces. It is preferred that the irregularity be provided by a notch, though alternatively the irregularity may be provided by a bump, an ear on the side of the rotor and/or stator pole with or without a bump or notch, or some other structure or feature creating a change in the standard inductance profile of the motor, to be described.

Rotor pole 56 has a radial centerline 62 through the motor shaft axis and bisecting the rotor pole face 60. It is preferred that notch 58 be offset from radial centerline 62 toward leading edge 64 of rotor pole face 60, to provide a rotor position detection signal during rising inductance, to be described. Stator pole 50 has a radial centerline 66 through the motor shaft axis and bisecting the stator pole face 54. It is preferred that notch 52 be offset from radial centerline 66 toward leading edge 68 of stator pole face 54, to provide a rotor position detection signal during rising inductance, to be described.

As rotor pole 56 approaches alignment with stator pole 50, comparably to FIG. 2, the notches cause a perturbation or blip 70, FIG. 7, in the rising portion 72 of the inductance profile L of the motor indicative of the position of the rotor relative to the stator. Either of notches 52 and 58 provides perturbation 70. The inclusion of both notches 52 and 58 provides a deeper and more pronounced perturbation 70. Continued rotation of the rotor moves rotor pole 56 into alignment with stator pole 50. When radial centerlines 62 and 66 coincide, FIG. 6, the pole faces are in a radial alignment position facing each other across gap 74 with maximum flux coupling, as in FIG. 3, and maximum inductance 76, FIG. 7, therebetween. In such radial alignment position, FIG. 6, notches 52 and 58 are radially non-aligned, and notch 52 faces across gap 74 proximate trailing edge 78 of rotor pole face 60, and notch 58 faces across gap 74 proximate trailing edge 80 of stator pole face 54. Continued rotation of the rotor moves rotor pole 56 to a position comparable to FIG. 4, and the notches provide a perturbation or blip 82, FIG. 7, in the decreasing slope portion 84 of the inductance profile. Perturbation 70 and/or 82 provides position detection, indicating the position of the rotor relative to the stator. It has been found that perturbation 70 produces a phase current dip during the rising portion 72 of the inductance profile L which is more pronounced than the phase current dip produced by perturbation 82 during the decreasing slope portion 84 of the inductance profile L. The frequency of either or both of perturbations 70 and 82 indicates motor speed.

FIG. 8 shows an alternate embodiment including a pair of asymmetrical notches 86 and 88 in the same pole face 90 of rotor pole 92. The notches are offset from radial centerline 94 toward leading edge 96 of the pole face. The asymmetrical notches may be provided in either or both of rotor and stator pole faces. Leading notch 86 provides an initialization or qualifying perturbation, and notch 88 provides a following confirming perturbation, to provide better discrimination against transients or other motor characteristics.

Figure 10:
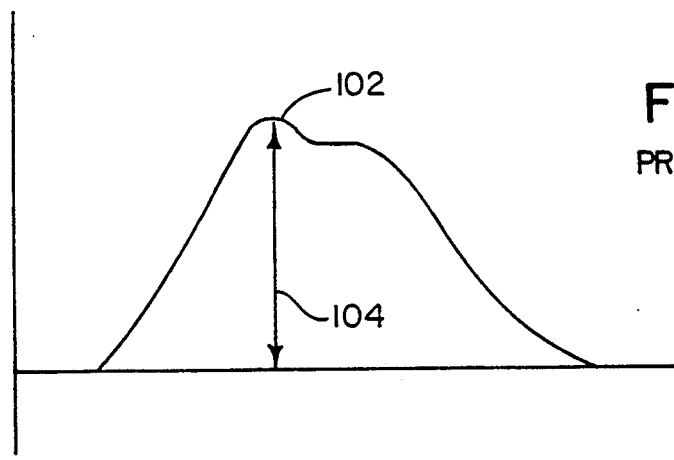
FIG. 10 shows a standard current profile for the motor of FIG. 1.
Figure 11:
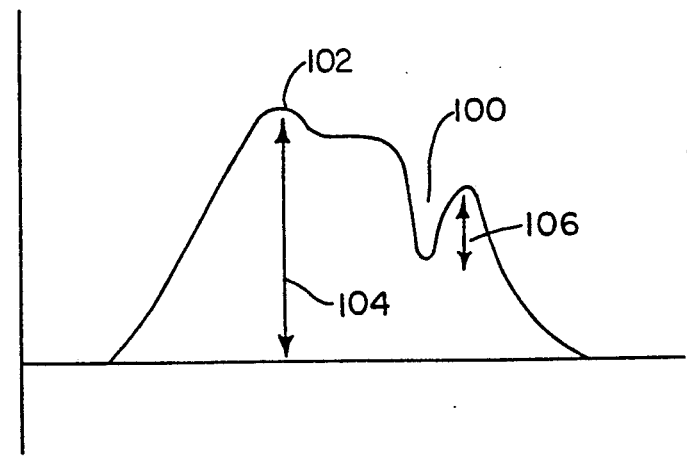
FIG. 11 shows a current profile in accordance with the invention.

In practice, the inductance is determined by sensing the current profile in a particular phase by a current transformer 98, FIG. 9. The standard current waveform profile for the motor of FIG. 1, without notches, is shown in FIG. 10. FIG. 11 shows the current waveform profile with the pole face irregularities provided by the notch structure of FIG. 6. The differential current dip at 100 is typically about 30% of the peak current 102, i.e. if the current increase at 104 to peak 102 is 10 amps, then the current decrease at 106 is 3 amps.

Conventional commutation circuitry energizes the phase windings to create a rotating magnetic field, which the rotor will follow due to the torque produced thereon. The phase windings are energized in a given sequence having a plurality of states. When the rotor passes a given position, it is desired to commutate to the next state in the energization sequence of the phase windings, to continue to apply torque to the rotor. The change or commutation from one state to the next ensures continued rotation of the magnetic field, and hence continued rotation of the rotor. The commutation circuitry responds to a rotor position signal to provide the proper commutation timing and energization state of the windings. An example of such commutation circuitry is shown in U.S. Pat. No. 5,015,927, incorporated herein by reference. In the present invention, the rotor position signal for the commutation circuitry is provided by the noted notch structure.

The invention is not limited to a particular geometry of motor, and is useful in a large frame motor or a small frame motor, and in various stator and rotor pole configurations. The notches may be cut or formed at the time the lamination punches are fabricated, in the case of laminated stators and/or rotors, or can be cut or ground in a later operation. A variety of notch placements, geometries, and sizes, as well as quantities of notches, may be used. Multiple notches may be of the same size and geometry, or different size and geometry. Multiple pole notches such as 86 and 88 and/or opposing pole non-aligned notches such as 52 and 58 may also provide a pseudo-instantaneous speed detection by the elapsed time or count between multiple perturbations, in addition to the speed detection provided by perturbation frequency. The invention is not limited to notches, but may be provided by other irregularities, as noted above. The invention produces by a stator or rotor irregularity, for at least one energizing of a stator pole per each rotor revolution, a relatively constant, measurable and accurate signal, e.g. current dip 100 FIG. 11, produced by perturbation 70, FIG. 7, in the inductance profile with varying motor speed and torque indicative of rotor position relative to the stator.

It is recognized that various equivalents, alternatives and modifications are possible within the scope of the appended claims.

We claim:

1. A switched reluctance motor providing position detection without a shaft position sensor, comprising a stator comprising a plurality of circumferentially spaced stator poles having windings therearound, each stator pole having an inner pole face subtending an arc along a first circumference, a rotor rotational about a motor shaft axis and comprising a central annular hub having a plurality of circumferentially spaced rotor poles extending radially outwardly from said hub, each rotor pole having an outer pole face subtending an arc along a second circumference concentric with and spaced slightly radially inwardly of said first circumference by a small clearance gap, said rotor producing an inductance profile in each of said stator poles as each of said rotor poles comes into and out of alignment with said stator poles when said rotor is rotated, a shape irregularity in one of said rotor and said stator poles, said irregularity, for at least one energizing of a stator pole per each rotor revolution, producing a relatively constant, measurable and accurate signal in the inducatance profile of said one energized stator pole with varying motor speed and torque indicative of rotor position relative to said stator.

2. A switched reluctance motor providing position detection without a shaft position sensor, comprising a stator comprising a plurality of circumferentially spaced stator poles having windings therearound, each stator pole having an inner pole face subtending an arc along a first circumference, a rotor rotational about a motor shaft axis and comprising a central annular hub having a plurality of circumferentially spaced rotor poles extending radially outwardly from said hub, each rotor pole having an outer pole face subtending an arc along a second circumference concentric with and spaced slightly radially inwardly of said first circumference by a small clearance gap, said rotor producing an inductance profile in each of said stator poles as each of said rotor poles comes into and out of alignment with said stator poles when said rotor is rotated, at least one of said rotor and stator poles having a shape irregularity providing a perturbation in the inductance profile of said rotor and said stator during rotation of said rotor indicative of rotor position relative to said stator.

3. The motor according to claim 2 wherein said irregularity extends radially from a pole face.

4. The motor according to claim 2 wherein said irregularity comprises a notch in a stator pole face.

5. The motor according to claim 2 wherein said irregularity comprises a notch in a rotor pole face.

6. The motor according to claim 2 comprising a first irregularity in a given stator pole, and a second irregularity in a given rotor pole.

7. The motor according to claim 6 wherein said given stator pole and said given rotor pole have a radial alignment position facing each other across said gap with maximum flux coupling and maximum inductance therebetween, and wherein said first and second irregularities are radially non-aligned when said given stator and rotor poles are in said radial alignment position.

8. The motor according to claim 2 wherein each of said poles has a radial centerline through said motor shaft axis and bisecting its respective pole, and wherein said irregularity is offset from said radial centerline.

9. The motor according to claim 8 wherein each said pole has a leading edge providing initial flux coupling to said stator pole next adjacent said rotor pole across said gap during rotor revolution, and wherein said irregularity is offset from said radial centerline toward said leading edge.

10. The motor according to claim 2 comprising a pair of asymmetrical irregularities in said rotor and stator poles.

11. The motor according to claim 10 wherein each of said poles has a radial centerline through said motor shaft axis and bisecting its respective pole, each said pole has a leading edge providing initial flux coupling to said stator pole next adjacent said rotor pole across said gap during rotor revolution, and said asymmetrical irregularities are offset from said radial centerline toward said leading edge.

12. A switched reluctance motor providing position detection without a shaft position sensor, comprising a stator comprising a plurality of circumferentially spaced stator poles having windings therearound, each stator pole having an inner pole face subtending an arc along a first circumference, a rotor rotational about a motor shaft axis and comprising a central annular hub having a plurality of circumferentially spaced rotor poles extending radially outwardly from said hub, each rotor pole having an outer pole face subtending an arc along a second circumference concentric with and spaced slightly radially inwardly of said first circumference by a small clearance gap, each of said poles having a radial centerline through said motor shaft axis and bisecting its respective pole, each said pole having a leading edge providing initial flux coupling to said stator pole next adjacent said rotor pole across said gap during rotor revolution, each said pole having a trailing edge opposite said radial centerline from said leading edge, a first irregularity in a given stator pole and offset from said radial centerline of said stator pole toward said leading edge of said stator pole, a second irregularity in a given rotor pole and offset from said radial centerline of said rotor pole toward said leading edge of said rotor pole, such that when radial centerlines of one of said stator poles and one of said rotor poles coincide, said first irregularity faces across said gap proximate said trailing edge of said given rotor pole, and said second irregularity faces across said gap proximate said trailing edge of said given stator pole.

13. A method for providing position detection in a switched reluctance motor without a shaft position sensor, comprising providing a stator having a plurality of circumferentially spaced stator poles having windings therearound, each stator pole having an inner pole face subtending an arc along a first circumference, providing a rotor rotational about a motor shaft axis and having a central annular hub having a plurality of circumferentially spaced rotor poles extending radially outwardly from said hub, each rotor pole having an outer pole face subtending an arc along a second circumference concentric with and spaced slightly radially inwardly of said first circumference by a small clearance gap, said rotor producing an inductance profile in each of said stator poles as each of said rotor poles comes into and out of alignment with said stator poles when said rotor is rotated, providing a shape irregularity in said rotor and said stator poles to provide a perturbation in said inductance profile during rotation of said rotor indicative of rotor position relative to said stator.

* * * * *